March 6, 1928. 1,661,152
G. A. ARIENS
WINDSHIELD WIPER
Filed May 19, 1926  3 Sheets-Sheet 1
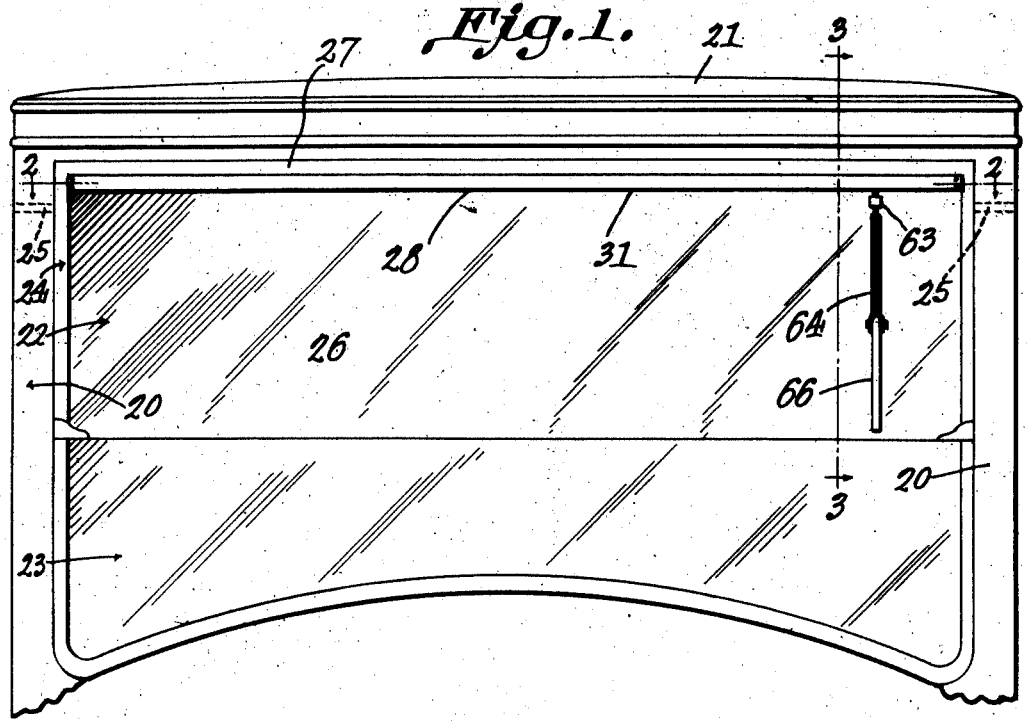
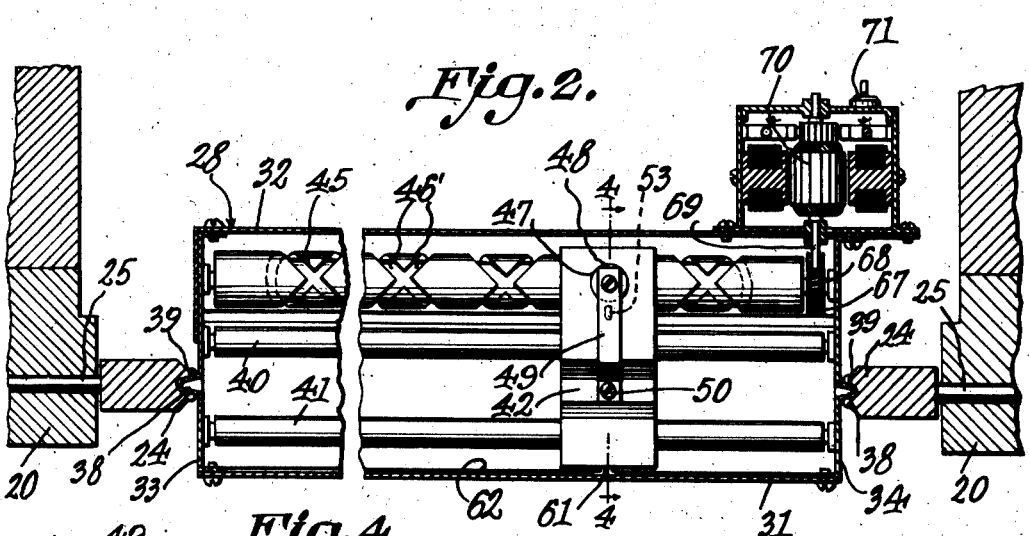
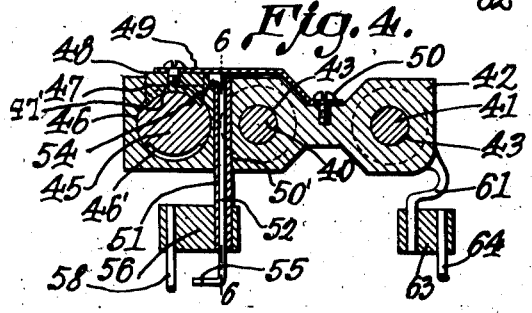
George A. Ariens
INVENTOR
BY Jerry Q Mathews
ATTORNEY March 6, 1928. 1,661,152
G. A. ARIENS
WINDSHIELD WIPER
Filed May 19, 1926    3 Sheets-Sheet 2
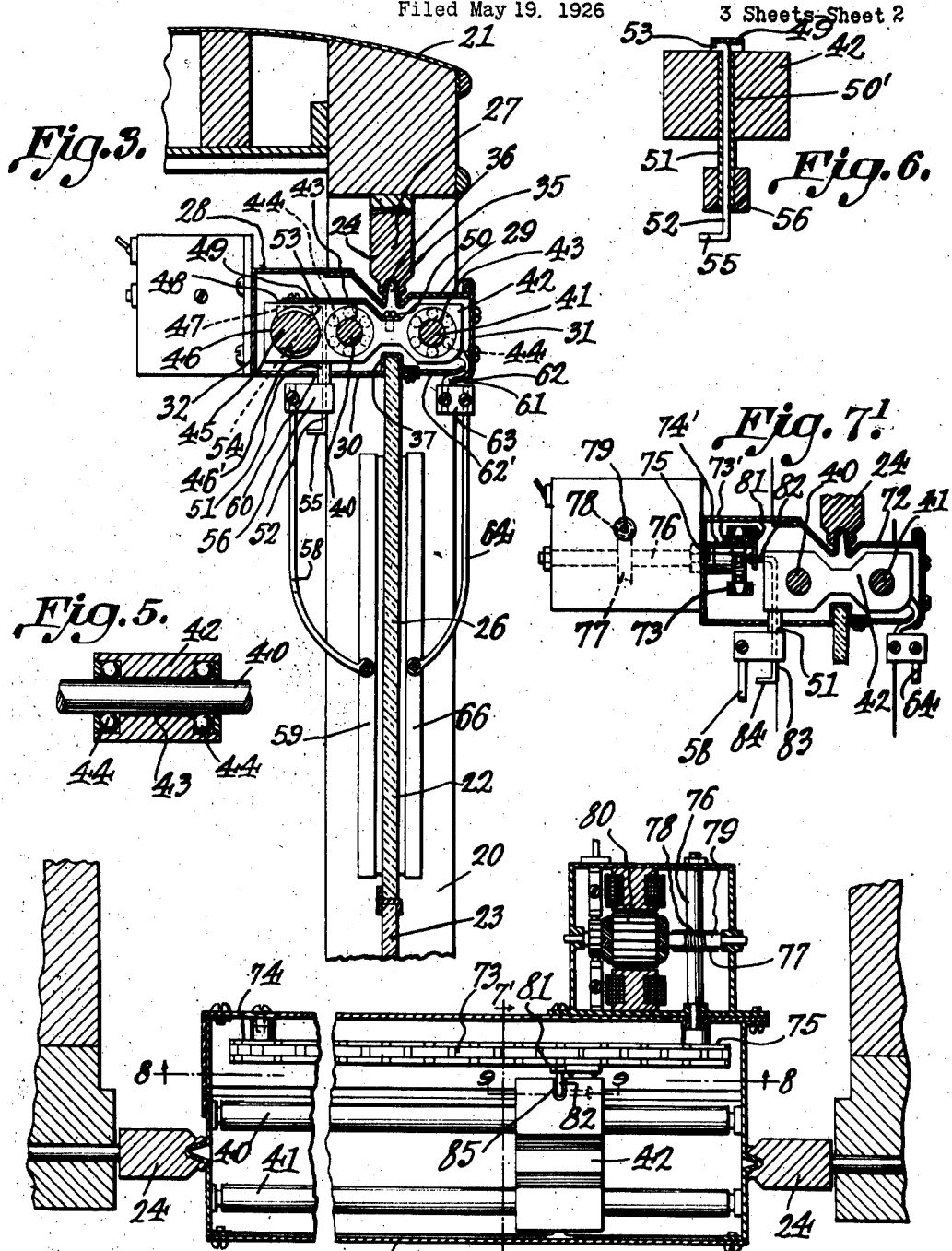
George A. Ariens
INVENTOR
BY Jerry M. Mathews
ATTORNEY

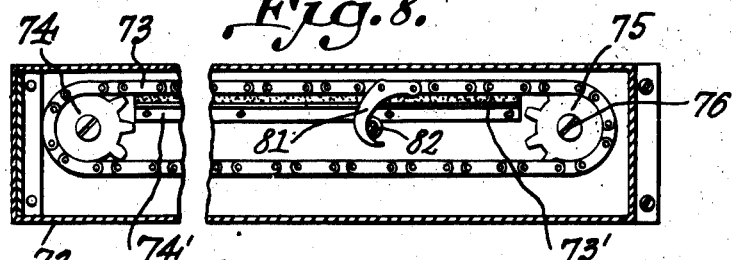
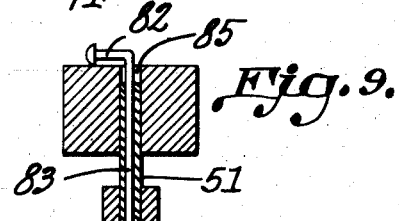
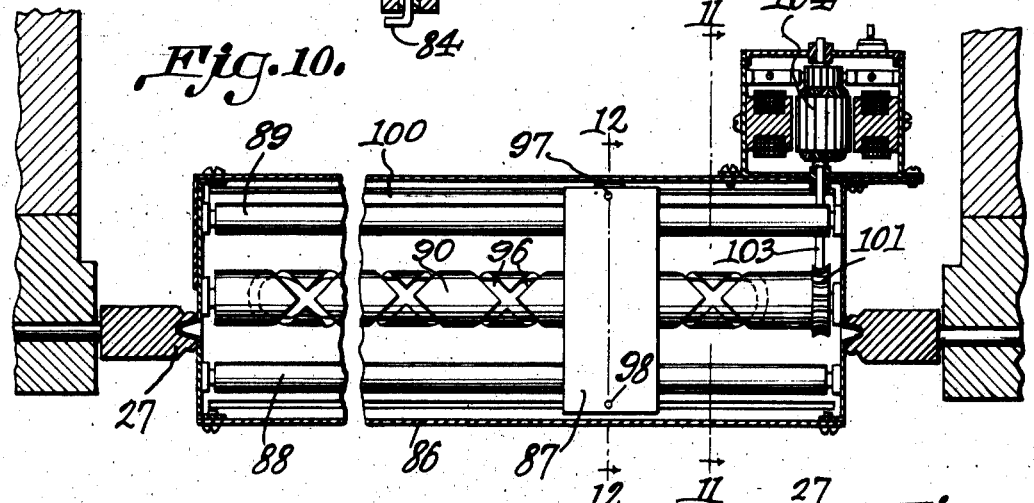
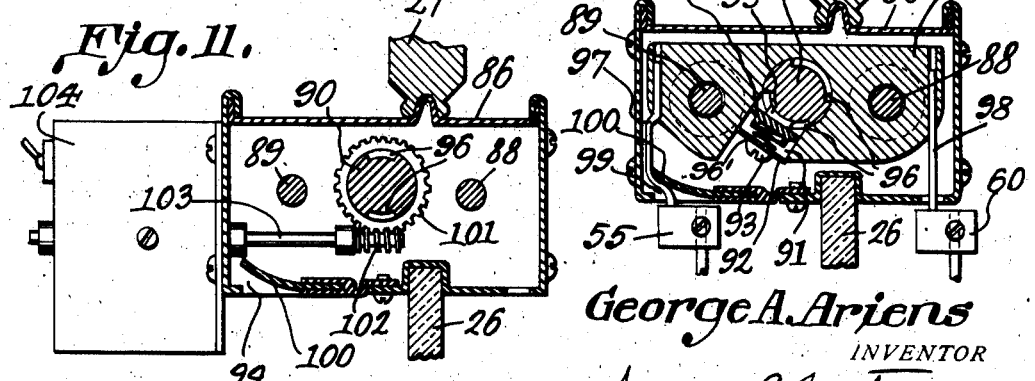

Patented Mar. 6, 1928.

1,661,152

UNITED STATES PATENT OFFICE.

GEORGE A. ARIENS, OF JEFFERSONVILLE, INDIANA.

WINDSHIELD WIPER.

Application filed May 19, 1926. Serial No. 110,171.

My invention relates to window or windshield cleaners.

An important object of the invention is to provide a device of the above mentioned character which is well adapted to be operated by a small electric motor.

A further object of the invention is to provide a device of the above mentioned character which will simultaneously clean both sides of the window or windshield, thereby affording a clear vision, under adverse weather conditions.

A further object of the invention is to provide means whereby the wiper case may be installed in the upper portion of the windshield frame with the usual glass.

A further object of the invention is to provide means for covering opening or openings in the wiper case, thereby eliminating drafts upon the operator.

A further object of the invention is to provide a windshield wiper of the above mentioned character which may be power driven or manually operated, at will.

A further object of the invention is to provide a device of the above mentioned character which when installed upon an automobile windshield will be neat in appearance and will present the smallest possible obstruction to the vision, and will permit of the usual angular adjustment of the windshield.

Other objects and advantages of the invention will be apparent during the course of the following description.

In the accompanying drawings, forming a part of this specification and in which like numerals are employed to designate like parts throughout the same, Figure 1 is a side elevation of a windshield wiper embodying my invention, showing the same in use, Figure 2 is a horizontal section taken on line 2—2 of Figure 1, Figure 3 is a transverse vertical section taken on line 3—3 of Figure 1, Figure 4 is a similar view taken on line 4—4 of Figure 2, Figure 5 is a detailed section through one of the bearings, Figure 6 is a longitudinal section taken on line 6—6 of Figure 4, Figure 7 is a horizontal longitudinal section through apparatus embodying a modified form of my invention, Figure 7' is a transverse section on line 7'—7' of Fig. 7, Figure 8 is a longitudinal vertical section taken on line 8—8 of Figure 7, Figure 9 is a transverse section taken on line 9—9 of Figure 7, Figure 10 is a horizontal longitudinal section through apparatus embodying a further modification of the invention, Figure 11 is a transverse section taken on line 11—11 of Figure 10, Figure 12 is a similar view taken on line 12—12 of Figure 10.

In the drawings, wherein for the purpose of illustration, is shown a preferred embodiment of my invention, the numeral 20 designates the forward uprights of the body of a closed automobile. Between these uprights and the top 21 is the usual front opening, receiving the upper and lower sections 22 and 23 of the windshield. The upper windshield section embodies a generally inverted U-shaped frame 24, which is angularly adjustably connected with the uprights 20 by means of clamping bolts 25. The pane of glass 26 is held within the lower portion of the frame 24 and is spaced from the top 27 of this frame, as shown. The windshield wiper embodies a casing, housing or support, designated as a whole by the numeral 28. This housing includes a top 29, a bottom 30, a forward side 31, and a rear side 32, all of which are suitably connected. The housing further embodies ends 33 and 34, Figure 2. The ends 33 and 34 are preferably detachably secured to the remainder of the casing or housing so that the several parts may be separated when desired. An important feature of the invention is the provision of an upwardly projecting rib or flange 35, which enters the groove 36 in the top 27 of the frame 24. The bottom 30 is provided with an inwardly projecting U-shaped socket 37, for receiving the top of the pane of glass 26. The ends 33 and 34 are provided with outwardly projecting ribs or flanges 38, to enter the grooves 39 in the sides of the frame 24. It is thus seen that the housing or casing is held within the top of the frame 24 in a similar manner to the pane of glass 26, effecting an air-tight joint with the frame 24, and with the top of the glass. If desired, suitable packing may be arranged between the interfitting parts. The casing or housing is relatively narrow and being located at the top of the pane of glass 26, will not perceptibly obstruct the vision of the driver, as the upper portion of the pane of glass is usually covered by a sun visor. Further, the housing is bodily mounted within the windshield frame 24, and hence is bodily shiftable therewith and in no way interferes with the usual angular adjustment of the windshield.

As more clearly shown in Figures 2 and 3, the housing 28 extends forwardly and rearwardly beyond the pane 26. Extending longitudinally within this housing 28, Figures 2 and 3, are spaced horizontal guide rods 40 and 41, preferably arranged upon opposite sides of the pane 26. These guide rods have their ends suitably attached to the ends 33 and 34 of the housing. The guide rods may be rotatable or rigidly attached to the ends 33 and 34.

The numeral 42 designates a carriage, having transverse openings 43, for slidably receiving the rods 40 and 41, and this carriage is preferably provided with ball bearings 44, engaging the guide rods to reduce friction. The carriage, of course, is adapted to slide longitudinally of the guide rods, in opposite directions.

Arranged rearwardly of the rear guide rod 40 in parallel spaced relation, is a reversing screw 45, the ends of which are suitably rotatably mounted upon the ends 33 and 34 of the housing 28. This reversing screw slidably operates through an opening 46 in the rear end of the carriage 42, and has no screw-threaded engagement with the wall of the opening, as the carriage is capable of being manually shifted with relation to the reversing screw. The reversing screw has an endless spiral groove embodying oppositely pitched spiral grooves 46'.

The carriage 42, Figure 4, is provided in its top with a vertical cylindrical opening 47, for the reception of a vertical movable and rotatable key 48, having a tongue 47' adapted to engage within the grooves 46'. This key is pivotally carried by a leaf-spring 49, attached to the carriage at 50, and this leaf-spring serves to normally hold the key in the lowermost position. The carriage is provided with a vertical opening 50', within which is rigidly mounted a tubular stem or support 51, and a shifting rod 52 is slidably mounted within this tubular stem. The upper end of this rod is bent into a lateral horizontal head 53, which is adapted to enter a recess 54, when the rod is turned to bring the head into a position parallel with the longitudinal axis of the carriage 42. This head is arranged directly beneath the leaf-spring 49 and when in this lowermost position, does not prevent the leaf-spring holding the key 48 depressed. The rod 52 is bent at its lower end into a laterally extending handle 55. The rod 52 may be shifted upwardly, and turned for a quarter of a revolution and it will then have its head 53 engaging the surface of the carriage, Figure 6. In this position, the head 53 will elevate the key 48 and withdraw its tongue from within the groove or grooves 46'. This will free the carriage from a driving connection with the reversing screw 45 whereby the carriage may be manually slid in either direction.

The tubular stem 51 carries a block 56, rigidly attached thereto carrying a depending resilient arm 58, equipped with a wiper 59 of any well known or preferred type. The tubular stem 51 operates within a longitudinal slot 60, in the bottom 30. A depending stem 61 is rigidly secured to the carriage 42 and operates through a longitudinal slot 62 in the bottom 30 and carries a block 63 rigidly secured thereto. This block carries a resilient arm 64, equipped with a wiper 66 of any well known or preferred type. A flexible flap 62' of leather or the like covers the opening or slot 62 but does not interfere with the movement of the stem 61. The purpose of this flap is to prevent the air from blowing through the housing, upon the driver. It is thus seen that a pair of wipers are provided, to operate upon the opposite faces of the pane of glass 26. Power operated means are provided to rotate the reversing screw 45, including a worm wheel 67 rigidly attached to one end thereof and this worm wheel is driven by a worm 68 attached to an armature shaft 69 of a motor 70, rigidly mounted upon the side 32, as shown. A switch 71 is employed to start and stop the motor.

In view of the foregoing description, it will be seen that when the key 48 is in the lowered position, to operate within the groove or grooves 46' and the motor 70 is running, that the reversing screw is rotated continuously in one direction, which will cause the carriage 42 to travel back and forth for the major portion of the length of the windshield. Both faces of the windshield are thus properly wiped. When it is desired to operate the device manually the motor may be stopped and the rod 52 manipulated to elevate the key 48 and retain it elevated out of the groove or grooves 46'. The operator may grasp the block 56 in the hand and shift the carriage longitudinally in opposite directions.

Attention is now invited to Figures 7 to 9, inclusive. In these figures, the numeral 72 designates a casing, housing, or support, substantially indentical with the casing or housing 28 and mounted in the windshield frame 24 in the same manner. The same guide rods 40 and 41 are employed, supporting the carriage 42, from which depend the wipers 59 and 66, as previously explained.

Instead of employing the reversing screw 45, the shifting means embodies an endless element or chain 73, passed about sprocket wheels 74 and 75. The sprocket wheel 74 is pivoted to one end of the side 32, and is preferably adjustable to take up slack in the sprocket chain 73, while the sprocket wheel 75 is rigidly mounted upon a transverse shaft 76, equipped with a worm wheel 77, driven by a worm 78, carried by the armature shaft 79 of a motor 80, rigidly mounted upon the housing, as shown. I may support the upper run of the endless chain 73 by a strip of felt 73', mounted upon a bracket 74' and the lower run may also be supported by a strip of felt mounted in the lower portion of the casing 72, if desired. This will aid in making the operation of the device noiseless. The sprocket chain 73 has one link equipped with a finger or catch 81, rigidly secured to this link, and this catch, Figure 7', is adapted to engage with a lateral extension or crank 82, formed upon the upper end of a rod 83, slidable within the tubular stem 51. The rod is provided at its lower end with a handle 84. The carriage 42 is provided with a recess or groove 85 extending longitudinally of the carriage, and when the rod 83 is properly turned the crank 82 may enter this groove 85 and will be locked in a position at a right angle to the chain 73, and in the path of travel of the catch or hook 81. The motor drives the chain 73 and the crank 82 will constitute a connection between the chain and carriage whereby the carriage will be made to travel back and forth throughout the major portion of the length of the pane of glass 26. When it is desired to manually operate the device, the rod 83 is elevated and the crank 82 removed from the groove 85, and this crank may be turned for a quarter of a revolution, so that it is parallel with the chain 73, Figure 7, and out of the path of travel of the catch 81. The carriage may be now manually shifted.

Attention is now called to Figures 10, 11 and 12, wherein is shown a third modification of the invention. In these figures the numeral 86 designates a casing, housing or support, substantially identical with the casing or housing 28, and mounted in the windshield frame 24, in a similar manner. The numeral 87 designates a carriage, similar to the carriage 42, and slidably mounted upon guide rods 88 and 89, having their ends supported by the housing 86, as shown. These guide rods 88 and 89 are, of course, arranged upon opposite sides of the pane of glass 26. The carriage 87 is equipped with wipers similar to the wipers 59 and 66, and these wipers engage opposite sides of the pane of glass 26. In this form of the invention, a reversing screw 90, similar to the screw 45, is pivotally mounted within the housing 86 but is arranged between the guide rods 88 and 89. The carriage 87, Figure 12, is provided in its lower portion with an angularly arranged cylindrical recess 91, which is covered by a plate 92, attached to the carriage by screws 93 or the like. A cylindrical block 94 is slidable and rotatable within the recess 91 and is equipped with a key 95, to operate within the oppositely pitched grooves 96 of the reversing screw 90. These grooves form one continuous endless groove. The block 94 is urged inwardly by means of a spring 96', arranged between the block 94 and plate 92. In this form of the invention, the tubular stem 51 is dispensed with and the stem 97 is substituted therefor, which is rigidly attached to the carriage. This stem carries the block 55. A stem 98 is attached to the opposite side of the carriage and carries the block 60. The wipers are suspended from these blocks, as described. The stem 97 operates within a wide longitudinal opening 99, through which access may be had to the screws 93. By removing the plate 92 the key 95 and associated elements may be removed and the device may be manually operated. As the opening 99 is comparatively wide, it is preferred to have the same covered by a flexible strip 100 to prevent air from blowing rearwardly upon the driver.

The screw 90 is driven by a worm wheel 101, rigidly secured thereto and this worm wheel is driven by a worm 102, carried by an armature shaft 103, of a motor 104, rigidly mounted upon the housing 86.

From the foregoing description, it is obvious that the motor will rotate the screw 90 continuously in one direction and this screw will move the carriage back and forth over the pane of glass, whereby the wipers will act upon the opposite sides thereof.

It is to be understood that the forms of my invention, herewith shown and described, are to be taken as preferred examples of the same, and that various changes in the shape, size and arrangement of parts may be resorted to without departing from the spirit of my invention or the scope of the subjoined claims.

Having thus described my invention, I claim:

1. In apparatus of the character described, a windshield frame having a transparent pane held within the frame with the upper edge thereof spaced from the upper bar of said frame, a housing mounted within the frame above the pane, said housing having a tight joint with the frame and pane and having a longitudinal opening, a carriage mounted to travel longitudinally within the housing, a stem secured to the carriage and passing through the opening, and a wiper secured to the stem.

2. In apparatus of the character described, a support mounted at the longitudinal edge of a transparent pane and projecting laterally therebeyond, a pair of guide rods carried by the support and arranged upon opposite sides of said pane, a single carriage mounted to travel upon both guide rods, a wiper connected with the carriage, and means to move the carriage.

3. In apparatus of the character described, a support extending longitudinally of a transparent pane, a carriage mounted upon the support, a tubular stem secured to the carriage, a wiper mounted upon the tubular stem, power operated means to reciprocate the carriage, and adjustable means for effecting a driving connection between the power means and the carriage and to break such connection, including a rod slidably mounted within the tubular stem.

4. In apparatus of the character described, a support extending longitudinally of a transparent pane, a carriage mounted upon the support, a tubular stem secured to the carriage, a wiper mounted upon the tubular stem, power operated means to reciprocate the carriage, a spring pressed element to effect a driving connection between the carriage and power operated means and movable out of engagement with the power operated means, and a rod slidably mounted within the tubular stem and adapted to move said element.

5. In apparatus of the character described, a support, a carriage to travel thereon, a reversing screw extending longitudinally of the support, a key attached to the support and adapted to engage the screw, a spring to urge the key toward the screw, a rod slidably mounted upon the carriage to shift the key from the screw, and a wiper connected with the carriage.

6. In apparatus of the character described, the combination of a housing mounted upon the longitudinal edge of a transparent sheet and extending laterally therebeyond upon opposite sides of the sheet, a pair of longitudinal guide rods mounted within the housing and arranged upon opposite sides of said sheet, a carriage mounted to travel within the housing upon the guide rods, wipers arranged upon opposite sides of the sheet and connected with the carriage near the guide rods, and means to move the carriage longitudinally.

7. In apparatus of the character described, the combination of a substantially horizontal housing mounted upon the longitudinal edge of a transparent sheet and extending longitudinally thereof throughout the major portion of the length of said sheet, a pair of guide rods extending longitudinally within the housing upon opposite sides of the sheet, a carriage projecting upon opposite sides of the sheet and traveling upon the guide rods, wipers arranged upon the opposite sides of the sheet and attached to the carriage near the guide rods, and a reversing screw having connection with the carriage to drive it.

8. In apparatus of the character described, guide means extending longitudinally of a windshield, a carriage mounted to slide upon the guide means and having an upstanding opening and recess on its top, a wiper carried by said carriage, a reversing screw extending longitudinally of the guide means, a key to engage the reversing screw, a spring carried by the carriage and connected with the key to move it toward the reversing screw and a rod slidable within the upstanding opening and provided at its upper end with a lateral extension to engage beneath the spring, said lateral extension being adapted to be moved into the recess and to be shifted upon the top of the carriage.

9. In apparatus of the character described, guide means extending longitudinally of a windshield, a carriage to travel longitudinally of the guide means, said carriage having an upstanding guide and a recess at its top, a wiper attached to the carriage, driving means extending longitudinally of the guide means, an element secured to the carriage to detachably engage the driving means and a rod slidable within said guide of the carriage and provided at its upper end with a crank adapted to co-act with the element to effect its disengagement from the driving means, said crank being adapted to enter said recess.

10. In apparatus of the character described, a wind-shield frame including a top and sides, said top and sides having longitudinal grooves at their inner edges, a transparent pane held within the lower portion of the frame with its ends seated within the grooves in said sides, the top of the pane being spaced from the top of said frame, a housing mounted within the frame between the top of the frame and the top of the pane, said housing being provided upon its top and ends with outwardly projecting longitudinal ribs to enter said grooves, said housing having a longitudinal groove in its bottom to receive the top of said pane, a carriage mounted within the housing to travel longitudinally thereof, a wiper connected with the carriage, and means for effecting a longitudinal movement of the carriage.

In testimony whereof I affix my signature.

GEORGE A. ARIENS.